Patented Jan. 25, 1949

2,459,874

UNITED STATES PATENT OFFICE 2,459,874

COATING COMPOSITION AND SHEETS COATED THEREWITH

Robert E. Fay, Jr., Bridgeport, Conn., assignor to E. I. du Pont de Nemours & Company, Wilmington, Del., a corporation of Delaware No Drawing. Application March 14, 1947, Serial No. 734,847

8 Claims. (Cl. 117—76)

1

This invention relates to the production of new coating compositions and flexible sheets coated therewith; and particularly to coated fabrics such as used for upholstery where rough usage is encountered.

A great many types of coating compositions have been employed for the coating of flexible base materials to be used as upholstery material and many improvements have been made in recent years in such products. It is well-known that certain types are useful where flexibility at low temperatures is a prime requisite. Other types are useful where abrasion resistance is the major requirement. Still other types are required to accomplish certain other requirements such as absence of tackiness or stickiness at elevated temperatures. Heretofore, it has not been possible to obtain all the desired properties of good abrasion resistance, flexibility at low temperature and absence of tackiness or stickiness at elevated temperatures in one coating composition. In formulating coating compositions for flexible base materials, it has been necessary to favor one desired property at the expense of other desirable properties. It has not been possible to manufacture one product which could be used in a wide variety of climatic conditions and have all the optimum desirable properties.

It is therefore an object of this invention to provide a new coating composition which is flexible at low temperatures, having improved resistance to abrasion, absence of tackiness at elevated temperatures, and which may be compounded without manufacturing difficulties. Another object is to prepare such coating compositions which will firmly adhere to a flexible base material. Other important objects will be readily apparent to those skilled in the art as the description of the invention proceeds.

I have discovered that the above objects can be attained by preparing a coating composition for coating flexible base materials comprising as the essential film-forming ingredients: (A) a copolymer of butadiene and acrylonitrile, (B) halogenated polyethylene, and (C) halogen-2-butadiene 1,3 plastic polymer, all blended in proper proportions, together with other compounding ingredients such as fillers, pigments, accelerators, etc.

The following detailed description is given by the way of illustration and not limitation.

EXAMPLE I

A woven cotton fabric with a sateen weave running 1.12 yards per pound per 53" width is base coated with the following composition to

2 provide a surface to which the new coating compositions will firmly adhere.

| | Lbs. | Ozs. |
|---|---|---|
| Copolymer of butadiene and acrylonitrile | 40 | |
| Complex terpene resin (advagum) | 3 | |
| Camel whiting (calcium carbonate) | 12 | |
| Stearic acid | | 6 |
| Zinc oxide | 2 | |
| Non-heat hardening phenolic resin | 4 | |
| Cumarone resin | 4 | |
| Benzothiazyl disulfide | | 10 |
| Sulfur | | 10 |

A suitable non-heat hardening phenolic resin for use in the above formula is sold on the open market by the Bakelite Division of Carbide & Carbon Chemicals Corporation under the designation BR–4036. A suitable cumarone resin is Cumar RH sold by the Barrett Company. A suitable copolymer of butadiene and acrylonitrile is "Hycar OR–15" obtainable from B. F. Goodrich Chemical Company.

The above ingredients are milled together on a water cooled two roll mill until thoroughly mixed and then sheeted. After cutting or breaking up in small pieces, the material is dispersed in methyl ethyl ketone at room temperature to form a spreading composition containing approximately 45% non-volatile and 55% methyl ethyl ketone.

Three coats of the above composition are applied to the sateen fabric by means of a doctor knife, depositing 3¼ ounces of non-volatile components per linear yard, 50" wide. The solvent is evaporated between each successive coat by passing the material through a heat zone.

The base coated fabric is next calendered with the following composition:

| | Parts by weight |
|---|---|
| Polymerized chloroprene | 100 |
| Copolymer of butadiene and acrylonitrile | 100 |
| Chlorinated polyethylene (65% chlorine) | 35 |
| Alkali metal salt of higher fatty acids—release agent | 6 |
| Zinc oxide | 70 |
| Magnesium oxide | 50 |
| Calcium carbonate (Kalite) | 45 |
| Ground leather | 45 |
| Light process petroleum oil | 10 |
| Colored pigments | 30 |
| Benzothiazyl disulfide | 4 |
| Sulfur | 4 |
| Phenyl salicylate | 0.4 |

A suitable grade of polymerized chloroprene suitable for use in the above formula is Neoprene GRM-10 obtainable on the open market from the Organic Chemicals Department of E. I. du Pont de Nemours and Company. A suitable grade of the copolymer of butadiene and acrylonitrile is "Hycar OR-15" obtainable from the B. F. Goodrich Chemical Company. A suitable grade of chlorinated polyethylene may be prepared in accordance with the teaching of U. S. Patent 2,398,-803, issued April 23, 1946 to James R. Myles et al., particularly the disclosure on page 2, column 1, lines 11-65 of the patent. Polyethylene halogenated by this method is referred to as "solution halogenated" polyethylene throughout the specifications. A suitable grade of an alkali metal salt of higher fatty acids is "Rubbex" marketed by Magnus Chemical Company which is used as a calender release agent.

The above composition was prepared by first milling the chlorinated polyethylene and the copolymer of butadiene and acrylonitrile on a two roll rubber mill at 275° F. until the two filmformers are thoroughly mixed. The composition was then cooled to room temperature and the mixing continued on the cold two roll mill with the addition of the polymerized chloroprene. The composition was cooled by passing cold water through the mixing rolls to prevent premature curing or scorching of the composition. After the polymerized chloroprene was distributed throughout the mass, all the secondary compounding ingredients in the above formula, except the sulfur and benzothiazyl disulfide, were added and thoroughly mixed into the mass. The composition was then taken from the two roll mill and stored until ready for calendering. Just prior to calendering, the above composition was heated while milling on a two roll rubber mill and the benzothiazyl disulfide and sulfur were added and thoroughly distributed throughout the composition.

After the composition was thoroughly milled and heated, it was transferred to the calender while hot (approximately 200° F.) where it was calendered onto the above-described base coated fabric. Approximately 11 ounces of calender mass were applied to the base fabric per linear yard 50" wide. A conventional surface coat of a lacquer or varnish surface coat was applied by doctor knife application immediately after the material leaves the nip of the calender and was then passed through a heat zone to evaporate the volatile solvents. The surface coat reduces the surface tack sufficiently to permit the coated fabric to be wound in roll form without sticking being encountered.

The above described coated fabric may be embossed in a conventional manner by passing between heated pressure rolls, one of which has a design engraved thereon and contacting the coated surface. Another embossing method employs heated plates.

A two tone finish may or may not be applied at this stage by means of a doctor knife application of a conventional lacquer containing pigments of contrasting color which is deposited only in the depressions of the embossed surface. The material is then passed through a heat zone to expel the volatile solvent in the lacquer. A clear lacquer coat free of colored pigments is applied to the embossed surface immediately before subjecting to the curing operation for 2½ hours at 260° F. which is the final manufacturing operation.

Additional coated fabric samples were prepared in the same manner as described above, except the chlorinated polyethylene in the calender mass was replaced with "solution method" chlorinated polyethylene of different chlorine contents, all other ingredients remaining the same, and also chlorinated polyethylene of different chlorine contents in which the chlorination was carried out while the polyethylene was suspended in an aqueous media, such as described in copending application S. N. 686,149 filed July 25, 1946 by Robert S. Taylor. Polyethylene chlorinated by this latter method is referred to as "aqueous suspension chlorinated" polyethylene.

The following table indicates the physical test results of the coated fabric samples containing the different chlorinated polyethylenes prepared by both the solution and aqueous suspension methods as well as a control sample in which case the chlorinated polyethylene was omitted from the calender mass (all other ingredients remaining the same).

Table I

| | Control Sample [1] | Solution chlorinated polyethylenes substituted for polyethylene in Example I | | | Aqueous suspension chlorinated polyethylene substituted for polyethylene in Example I | | | |
|---|---|---|---|---|---|---|---|---|
| | | 30% chlorine | 55% chlorine | 65% chlorine (Example I) | 29% chlorine | 32.5% chlorine | 60% chlorine | 65.7% chlorine |
| Taber Abrasion, Lost from Sample 4¼" Diameter, 10,000 cycles, CS 10 Wheel _____ grams_ | 0.445 | 0.390 | 0.125 | 0.090 | 0.345 | 0.305 | 0.120 | 0.090 |
| Wyzenbeck Abrasion, Strokes (240-J), Emery Paper Changed Every 500 Rubs, Failure Encountered _____ | 2,000 | 2,000 | 4,500 | >5,000 | 2,000 | 2,000 | 3,000 | 3,500 |
| 4 lb. Edge Wear Test, Failure Encountered _____ | 2,000 | 2,400 | >50,000 | >50,000 | 16,000 | 18,000 | >50,000 | 50,000 |
| Scrub _____ | 1,000 | 1,000 | 3,000 | 5,000 | 3,000 | 1,500 | 2,500 | 4,000 |
| Cold Crack-Resistance, Sample Failed at _____ °F__ | -40 | -40 | -30 | -30 | -40 | -40 | -30 | -30 |

[1] Same as Example I except chlorinated polyethylene omitted from calender coat.

A description of the Wyzenbeek Abrasion Test will be found in paragraph F-2g, Federal Specification KK-L-136b for Leather; artificial (upholstery), dated October 8, 1945. End point is reached when coating wears through to the fabric backing.

A description of the mechanical scrub test will be found in an article by Ernest B. Benger and M. N. Nickowitz, Automotive Industry, 49, 1262-6 (1923), December 20. The end point is reached when the coating breaks.

A description of the Taber Abrasion Test will be found in Sec. IV, part 5 of Federal Spec. CCC-T-191a, Supplement, page 29 and 30, dated October 8, 1945.

The "Edge Wear Test" is conducted with a Wyzenbeek abrasion apparatus in which the abrading surface is #10 Duck and a 2" x 4" sample to be tested is stretched over a curved surface in such a manner that an area of approximately ⅛" x 2" is pressed against the #10 Duck with a 4 lb. weight. The sample is held stationary and the #10 Duck is rocked back and forth through approximately a 22½° arc. The end point is reached when the coating wears through to the fabric backing.

The cold crack test is conducted by exposing the coated fabric to a temperature at which it is to be tested for at least 60 minutes, then creasing the sample sharply with the coating on the outside of the fold.

The material is particularly useful as upholstery for truck, bus, railroad and theater seats or where heavy duty material is required.

From the above table, it will be noted that the abrasion resistance as measured by both the Taber and Wyzenbeek apparatus as well as the 4 pound edgewear test, increases with the chlorine content of the chlorinated polyethylene made by both the solution method and aqueous suspension method. Also the toughness of the film as measured by the mechanical scrub test increases with chlorine content of the chlorinated polyethylene by both methods of chlorination mentioned above.

The following additional examples represent useful compositions of this invention which may be calendered on cloth. The compositions are prepared in the same manner as outlined above.

|  | Parts by weight | | | |
|---|---|---|---|---|
| Copolymer of butadieneacrylonitrile | 80.0 | 20.0 | 80.0 | 20.0 |
| Polymerized chloroprene | 20.0 | 80.0 | 20.0 | 80.0 |
| Chlorinated polyethylene (25% to 72% chlorine) | 10.0 | 10.0 | 100.0 | 100.0 |
| Release agent—Alkali metal salt of higher fatty acids | 3.0 | 3.0 | 3.0 | 3.0 |
| Zinc oxide | 35.0 | 35.0 | 35.0 | 35.0 |
| Magnesium oxide | 25.0 | 25.0 | 25.0 | 25.0 |
| Calcium carbonate ("Kalite") | 22.5 | 22.5 | 22.5 | 22.5 |
| Ground leather | 22.5 | 22.5 | 22.5 | 22.5 |
| Light process petroleum oil | 5.0 | 5.0 | 5.0 | 5.0 |
| Colored pigments | 15.0 | 15.0 | 15.0 | 15.0 |
| Benzothiazyl disulfide | 2.0 | 2.0 | 2.0 | 2.0 |
| Sulfur | 2.0 | 2.0 | 2.0 | 2.0 |
| Phenyl salicylate | 0.2 | 0.2 | 0.2 | 0.2 |

To illustrate further the advantages resulting from the blending of halogenated polyethylene with a mixture of polymerized chloroprene and copolymer of butadiene and acrylonitrile, the following compositions, with and without the chlorinated polyethylene, were prepared:

|  | Comp. A | Comp. B |
|---|---|---|
| Polymerized chloroprene (neoprene GRM-10) | 100 | 100 |
| Copolymer of butadiene and acrylonitrile | 100 | 100 |
| Chlorinated polyethylene (65% chlorine-solution method) |  | 100 |
| Zinc oxide | 10 | 10 |
| Magnesium oxide | 10 | 10 |
| Benzothiazyl disulfide | 2 | 2 |
| Sulfur | 2 | 2 |

The above composition "B" containing the chlorinated polyethylene was prepared on a two roll rubber mill by first milling the chlorinated polyethylene and copolymer of butadiene and acrylonitrile at 275° F. until thoroughly blended. The blend was cooled to room temperature and the polymerized chloroprene was added and the milling continued with water cooled rolls to keep the temperature of the composition below that which would cause scorching or premature curing. After the three film-formers were thoroughly blended, the curing agents (zinc oxide, magnesium oxide, benzothiazyl disulfide and sulfur) were added and milling continued until the composition was uniform throughout. The composition was taken from the rolls in the form sheets and was press cured in the form of sheets ⅛" thick for 45 minutes at 307° F., under a pressure of 2,000 lbs./sq. inch during the cure. The composition "A" without the chlorinated polyethylene was prepared in a like manner except the preliminary mixing at the elevated temperature was omitted. After the sheets were pressed, cured and cooled to room temperature, they were tested and the following results were obtained:

|  | Comp. A | Comp. B |
|---|---|---|
| Hardness (Shore) | 52 | 75 |
| Tensile Strength (lbs./sq. in.) | 920 | 1,775 |
| Per Cent Elongation | 400 | 305 |

The Shore Hardness test was carried out by the method given in the "A. S. T. M. Standards On Rubber Coated Products" p. 112–114 (D676—44%) issued March 1936, by the American Society For Testing Materials, 260 South Broad Street, Philadelphia 2, Pennsylvania.

The above data indicates that the chlorinated polyethylene increases tensile strength and hardness of the film, properties which are highly desirable for flexible fabric coatings. The elongation was decreased by the presence of the chlorinated polyethylene.

In all the above compositions, brominated polyethylene can be used in place of chlorinated polyethylene with comparable results. In general, in preparing films containing brominated polyethylene, a slightly greater amount of the brominated polymer will be required than the chlorinated polymer to obtain films of equal properties due to the atomic weight of bromine being greater than chlorine.

The preferred embodiment of this invention employs the calendering process for the application of the new coatings to the flexible base materials. It is within the scope of this invention to prepare dispersions or solutions of said compositions in organic solvents and apply such compositions by means of a doctor knife in a plurality of coats, evaporating the volatile solvent between each successive coat by passing the material through a heat zone. The solution coated material is finished and cured in the same manner as the calender coated material.

The new compositions of this invention may be applied to a wide variety of base materials. While the preferred embodiment employs flexible base materials, they may be applied to rigid and semi-rigid surfaces. The full advantages of the invention are realized by coating flexible base materials such as woven and unwoven sheet materials. Such flexible sheets may be prepared from a wide variety of fibers such as cotton, rayon, nylon, and glass, or mixtures thereof. The particular use to which the products are to be subjected will determine the type of fiber and fabric to be employed for the base material.

The use of the finished product will also determine the quantity of the new composition to be applied to the flexible sheet materials. In certain uses where strong adhesion of the coating to the base fabric is not important, it is possible to omit the base coating entirely in which case the new compositions are calendered directly on the fabric base. When the new compositions are applied from dispersions or solutions, very strong adhesion is obtained and the base or ground coating may be eliminated.

The following table indicates the useful range of each essential film-forming ingredient:

| | Percentages Based On Total Of Essential Film-Forming Ingredients Only | | |
|---|---|---|---|
| | Useful Range | Preferred Range | Preferred Composition |
| | Per cent | Per cent | Per cent |
| Copolymer of Butadiene and Acrylonitrile | 10–75 | 30 to 50 | 42.5 |
| Polymerized Chloroprene | 10–75 | 30 to 50 | 42.5 |
| Halogenated Polyethylene | 10–50 | 15 to 35 | 15.0 |

In general, as indicated in Table I, the abrasion resistance and hardness of the film increases with the amount of chlorine in the chlorinated polyethylene. Therefore, in the above ranges, it is more advantageous to use the higher chlorine containing polymers where the chlorinated polyethylene content is low. The chlorine content of the chlorinated polyethylene may vary between 25% and 72% for maximum abrasion resistance. While the invention has been described with respect to chlorinated polyethylene, other halogenated polymers, particularly brominated polyethylene, may be used with equally good results. The preferred range of halogen in the halogenated polyethylene is 40% to 70%.

In the examples other halogen-2-butadiene 1,3 plastic polymers may be used in place of chloroprene. The halogen may be bromine or fluorine and for some purposes iodine.

Coated fabrics employing neoprene (polymerized chloroprene) as the sole film-forming ingredient in the coating are outstanding for their oil resistance, flexibility and resistance to cracking at low temperatures, and outdoor durability, but are deficient in abrasion resistance which is an all important requirement for heavy duty upholstery material. When copolymers of butadiene and acrylonitrile are blended with the neoprene, there is some improvement in the abrasion resistance at the expense of resistance to cracking at low temperatures.

Blends of chlorinated polyethylene with copolymers of butadiene and acrylonitrile result in fair abrasion resistance but are lacking in resistance to cracking at low temperatures.

Blends of neoprene and chlorinated polyethylene result in useful compositions but are difficult to prepare by conventional methods on a two roll mill. It is necessary to heat the chlorinated polyethylene sufficiently to obtain a plastic mass, in order to obtain a good dispersion of the other compounding ingredients and at this temperature it is difficult to process the neoprene.

By blending the three film-formers, namely, halogenated polyethylene, copolymers of butadiene and acrylonitrile and neoprene (polymerized chloroprene) within the ranges set forth above, together with the usual compounding ingredients, films are produced which have excellent abrasion resistance, flexibility and resistance to cracking at low temperatures, as well as good outdoor durability.

It was surprising and unexpected that the abrasion resistance of films containing the copolymer of butadiene and acrylonitrile blended with chlorinated polyethylene as the sole film-forming ingredients could be greatly increased by the addition of neoprene, a material which itself is wholly lacking in abrasion resistance. While it is not definitely known and I do not wish to be limited by any theory, it is believed the improvements of this invention are realized by the reaction or the chemically combining of the neoprene with either or both of the other two film-forming materials during the heating or curing period.

It has been established that the most desirable physical properties are obtained by those butadiene-acrylonitrile copolymers having an acrylonitrile content of 30–50%, but beneficial effects can be realized with polymers containing more or less acrylonitrile. The trade names for some of the butadiene-acrylonitrile copolymers are "Hycar OR–15," "Hycar OR–25," "Perbunan 35," "Perbunan 26," "Butaprene NXM," "Butaprene NL," "Chemigum N–1," "Chemigum N–3," etc.

In addition to the coated fabrics described in detail above, the compositions of this invention are well suited for many end uses, such as e. g. automobile tires, hose, floor covering, unsupported sheet stock and many molded articles for industrial applications.

It is apparent that many widely different embodiments of this invention may be made without departing from the spirit and scope thereof, and therefore, it is not intended to be limited except as indicated in the appended claims.

I claim:

1. A coating composition which is tough and rubbery when cured comprising as essential film-forming ingredients: (A) a copolymer of butadiene and acrylonitrile the acrylonitrile content being between 30% and 50% of the copolymer, (B) halogenated polyethylene containing from 25% to 72% halogen, and (C) halogen-2-butadiene 1,3 plastic polymer.

2. The composition of claim 1 in which the halogenated polyethylene is chlorinated polyethylene.

3. A flexible base having a substantial coating on at least one side of the composition of claim 1.

4. A flexible base material having a substantial coating of the composition of claim 1 in which the halogenated polyethylene is chlorinated polyethylene.

5. The composition of claim 1 in which the copolymer of butadiene and acrylonitrile is present in amount within the range of 10% to 75%, the polymerized chloroprene is within the range of 10% to 75%, and the halogenated polyethylene is within the range of 10% to 50%, said percentages being based on the weight of the said essential film-forming ingredients.

6. The method of preparing an artificial leather which is highly resistant to abrasion which comprises coating a sateen fabric running 1.12 yards per pound per 53" width material with a composition having the following composition:

| | |
|---|---|
| Copolymer of butadiene and acrylonitrile pounds | 40 |
| Complex terpene resin (advagum) do | 8 |
| Camel whiting (calcium carbonate) do | 12 |
| Stearic acid ounces | 6 |
| Zinc oxide pounds | 2 |
| Non-heat hardening phenolic resin do | 4 |
| Cumarone resin do | 4 |
| Benzothiazyl disulfide ounces | 10 |
| Sulfur do | 10 | applying sufficient of the said composition until 3¼ ounces of non-volatile material is applied per linear yard of 50" width material, allowing the solvent to evaporate, and then applying 11 ounces per yard of 50" material of a composition having the following formula in parts by weight:

| | |
|---|---|
| Polymerized chloroprene | 100.0 |
| Copolymer of butadiene and acrylonitrile | 100.0 |
| Chlorinated polyethylene (65% chlorine) | 35.0 |
| Release agent | 6.0 |
| Zinc oxide | 70.0 |
| Magnesium oxide | 50.0 |
| Calcium carbonate | 45.0 |
| Ground leather | 45.0 |
| Light process petroleum oil | 10.0 |
| Colored pigments | 30.0 |
| Benzothiazyl disulfide | 4.0 |
| Sulfur | 4.0 |
| Phenyl salicylate | 0.4 |

7. The product of the process of claim 6.

8. A composition of matter which is tough and rubbery when cured containing the following ingredients by weight:

| | |
|---|---|
| Polymerized chloroprene | 100.0 |
| Copolymer of butadiene and acrylonitrile the acrylonitrile content being between 30% and 50% of the copolymer | 100.0 |
| Chlorinated polyethylene (65% chlorine) | 35.0 |
| Release agent | 6.0 |
| Zinc oxide | 70.0 |
| Magnesium oxide | 50.0 |
| Calcium carbonate | 45.0 |
| Ground leather | 45.0 |
| Light process petroleum oil | 10.0 |
| Colored pigments | 30.0 |
| Benzothiazyl disulfide | 4.0 |
| Sulfur | 4.0 |
| Phenyl salicylate | 0.4 |

ROBERT E. FAY, JR.

REFERENCES CITED

The following references are of record in the file of this patent:

UNITED STATES PATENTS

| Number | Name | Date |
|---|---|---|
| 2,252,486 | Arveson | Aug. 12, 1941 |
| 2,319,074 | McGill | May 11, 1943 |
| 2,373,461 | Crampton | April 10, 1945 |
| 2,405,038 | Jennings | July 30, 1946 |
| 2,416,060 | McAlevy et al. | Feb. 18, 1947 |
| 2,422,919 | Myles et al | June 24, 1947 |

OTHER REFERENCES

Ind. Eng. Chem., vol. 36 of 1944, pages 209–211.